UNITED STATES PATENT OFFICE.

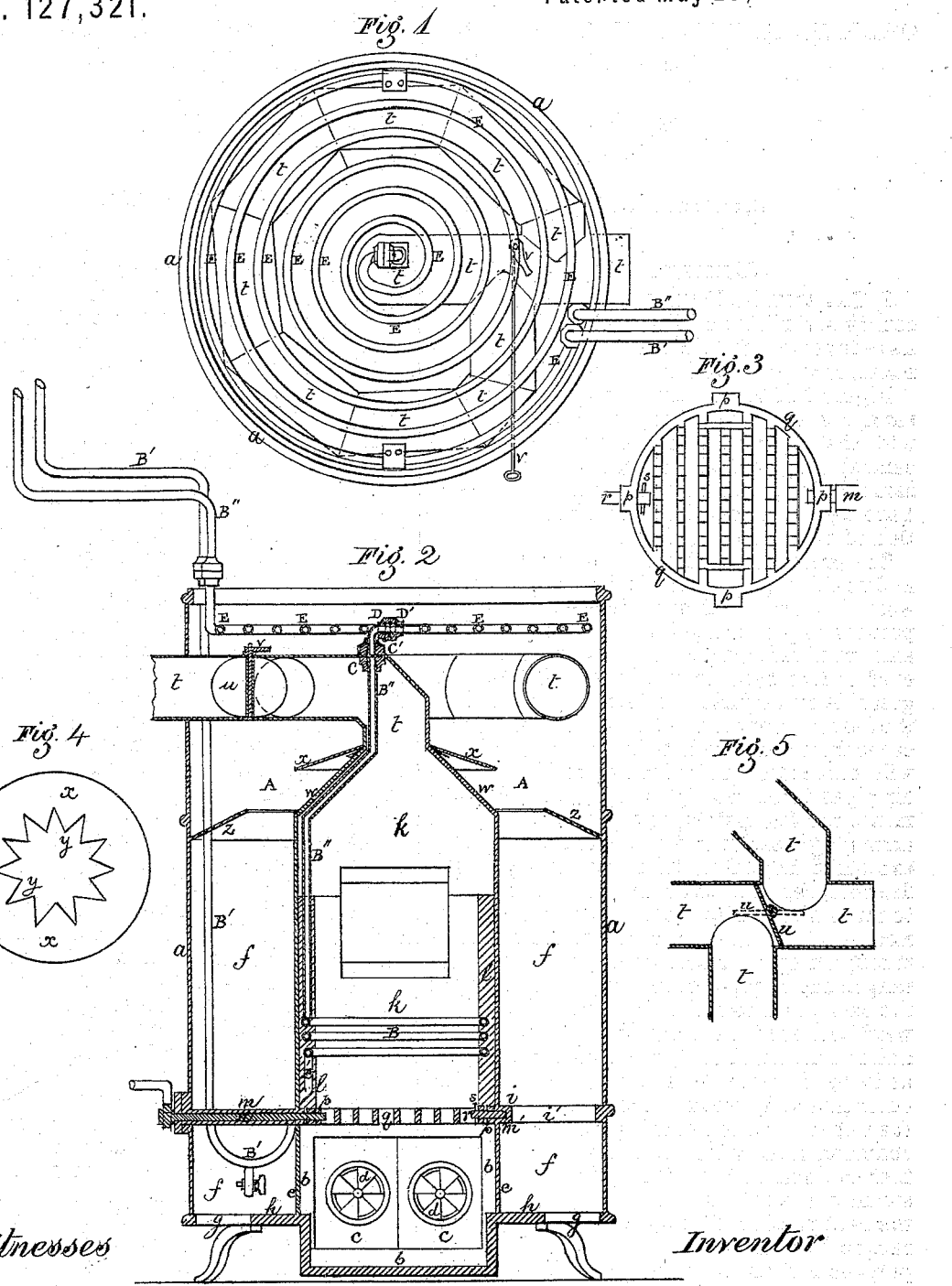

CHARLES M. DRENNAN, OF BOSTON, ASSIGNOR TO HIMSELF AND FRANCIS ALGER, OF NATICK, MASSACHUSETTS.

IMPROVEMENT IN HOT-AIR FURNACES.

Specification forming part of Letters Patent No. 127,321, dated May 28, 1872.

SPECIFICATION.

I, CHARLES M. DRENNAN, of Boston, in the county of Suffolk and State of Massachusetts, have invented certain Improvements in Furnaces, of which the following is a specification:

Figure 1 of the accompanying drawing represents a top view of my improved furnace, with the upper portion removed. Fig. 2 is a central longitudinal vertical section of the same, looking toward the front. Figs. 3 and 4 are top views; and Fig. 5 is a horizontal section of portions of my invention.

The present invention relates to certain new and useful improvements in furnaces, whereby a simple, economical, and effective heating apparatus is produced, that will furnish a large amount of radiating surface and emit a moistened or live heat, so as to overcome the disagreeable and injurious effects experienced by the dead, dry, or scorched heat that usually proceeds from ordinary hot-air furnaces, and that will enable rooms not ordinarily reached by hot-air pipes to be readily heated. My improvements consist, mainly, in so constructing and arranging a series of devices, to be more fully explained hereafter, in connection with the fire-chamber and outer case of a furnace, as to cause a flow of hot water or steam to be carried up within the fire-chamber, and circulate through a spiral scroll or other suitable arrangement of pipes over a cone-shaped top of the same, and heat the air which extends upward between the fire-chamber and outer case, and is contracted in its passage at the top, so as to be directed from the cool sides of the outer case and brought directly in contact with the upper or most heated portion of the fire-chamber, from which it ascends and is further and uniformly heated by the hot water or steam in the said scroll of pipes, and also by the heat passing through the smoke-pipe, arranged horizontally in an octagonal or other polygonal form between the scroll of pipes and the cone-shaped top of the fire-chamber, the heat emitted from the scroll of pipes serving to moisten and enliven the air before entering the hot-air pipes, through which it is conveyed to the several apartments. My invention also consists in so forming the grate of the fire-chamber as to allow it to be readily operated either at the front or at the side of the furnace; and of so arranging and operating the smoke-pipe as to cause an indirect draught, so as to retard the heat and produce a radiating medium, or to form a direct draught to carry off any extra amount of heat.

In the drawing, $a$ represents the outer case of my improved furnace, which is provided with an ash-box or chamber, $b$, having doors $c$, furnished with draught-registers $d$, and is separated from the outer case by a circular partition, $e$, which extends upward and forms the case of a fire-chamber, $k$, between which and the case $a$ is an air-passage, $f$, which connects with the outer air through openings $g\ g$, formed in a frame, $h$, connecting the bottom of the outer case $a$ with the ash-box or chamber $b$. Above the frame $h$ is a similar frame, $i$, provided with openings $i'$, and connecting the outer case $a$ with the bottom of a fire-chamber, $k$, and forming a support for fire-bricks $l$, with which the fire-chamber $k$ is partly lined. The frame $i$ is formed on one side with a socket, $m$, that supports a rod, $n$, which connects with a socket or stem, $p$, on one side of a grate, $q$, which is formed with three other sockets or stems $p$ on its periphery, opposite to each other, as shown in Fig. 3. The opposite side of the frame $i$ is provided with a socket, $m'$, that contains one end of a bar or stem, $r$, which passes through the socket $p$ on one side of the grate $q$, and is held in place by a pin, $s$. The sockets $m\ m'$ on the frame $i$ may be formed either toward the side or front of the furnace, as may be desired. The fire-chamber $k$ extends upward in a circular form, and slopes at the top in a conical form until it is joined to the vertical and lower portion of a smoke-pipe, $t$, which is formed of a polygonal shape, and extends in angular sections horizontally above the conical top $w$ of the fire-chamber $k$, around the interior of the outer case $a$ until it joins a straight longitudinal section of the pipe $t$, one end of which connects by an elbow with the lower portion, and the other end passes out through the outer case $a$ and connects with a chimney. One end of the horizontal angular portion of the pipe $t$ enters the longitudinal portion on one side in advance of the other opposite horizontal angular end, and between them is a damper, $u$, turning on a pivot and operated by a cranklever, v, or any other suitable device, so as to close the damper u (as shown by the firm lines in Fig. 5) and cause the smoke and heat to pass around the whole circuit of the horizontal pipes t, or to open it, as shown by the dotted lines Fig. 5, and admit of the direct passage of the smoke, &c., into the chimney. Fitting around the vertical portion of the smoke-pipe t, and over the conical top w of the fire-chamber k, is a circular, sloping, or cone-shaped plate or radiator, x, formed with a zigzag or other suitably-formed aperture, y, the points of which coming in contact with the top w, form apertures through which the heated air passes. Connected with and projecting upward in an oblique direction from the interior of the outer case a, beneath the radiator x, a little below the base of the conical top w, is a circular flange, z, that extends partly across the air-passage f, so as to contract the air in its upward passage and direct it upon the conical top w, from which it passes up through the apertures formed by the zigzag or other formed edge of the radiator x, and through a space, A, between the rims of the radiator x and the flange z. Within the lower portion of the fire-chamber k is set in the fire-bricks l a coil of pipes, B, the end of the lower pipe of which connects with a cold-water pipe, B', which passes through the case of the fire-chamber and extends upward against the inside of the outer case a, and passes out of the furnace at the top and connects with a tank or reservoir suitably placed, or with the street pipe. One end of the upper pipe of the coil B connects with an end of a pipe, B'', which passes upward on the inside of the fire-chamber k, and through the top of the smoke-pipe t, where it is provided with a nut, C, having a screw-socket which receives the screw-end of an elbow-pipe having an outer screw-thread which receives and holds a screw-nut, C', that screws down tightly on the top of the smoke-pipe t, and forms a steam or water-tight joint. The other end of the elbow is formed in a similar manner, and is provided with nuts D D', having inner screw-threads and forming a steam or water tight joint, and connects with one end of a spiral scroll or other suitable arrangement of pipes, E, arranged horizontally or in any proper position around the top of the furnace over the horizontal portion of the smoke-pipe t. The outer end of the scroll E connects with the vertical end of a pipe provided with screw-nuts F, which passes up and is connected with the cold-water or other suitable tank, or may be extended to any distant room of a building and attached to a proper radiator, thus conveying steam or hot water through the same, and readily heating rooms that it has hitherto been found impracticable to warm, owing to the length of hot-air pipe required by the ordinary hot-air furnaces. The bottom of the pipe B is provided with a draw-off pipe, G, supplied with a proper faucet. The furnace is provided with a suitable top or cover, not shown in the drawing, through which the upright pipes B B' pass, and to which the hot-air pipes connecting with the several apartments of a building are attached. It may also be provided with the requisite steam-gauges, valves, &c., for using it as a steam-heating apparatus, in which case suitable pipes connecting with radiators in the several apartments are attached to the scroll E.

The operation of my invention is as follows: Heat, being applied to the fire-chamber k, rises to the top or cone-portion w of the furnace, and passes with the smoke through the smoke-pipe t, the damper u of which being closed, as shown in Fig. 5, causes it to circulate through the horizontal portion of the pipe t, and then pass through the opening on the other side of the straight longitudinal portion of the pipe t into the chimney, the heat being thus retarded in its passage and its radiating-surface thereby increased. By opening the damper u, which is operated by the lever v, the heat and smoke find a direct exit from the smoke-pipe t through the straight portion into the chimney.

The water admitted through the pipe B' passes through the coil B, where it becomes heated, and rises through the pipe B'' into the scroll of pipes E, through which it circulates and further heats the air, which, entering through the openings g in the bottom of the furnace passes upward through the passage f, and striking against the under side of the sloping flange z, is thrown against the coned top w and under the radiator x, by which it is directed through the apertures formed by the pointed or other shaped orifice of the radiator x, a portion escaping through the space A into the upper portion of the furnace, where it is further heated by the heat passing through the smoke-pipe t, and the hot water or steam circulating through the spiral scroll E, the heat of the latter serving to moisten and enliven the air and rid it of the disagreeable and injurious effects produced from heat radiating directly from the iron of ordinarily-constructed hot-air furnaces.

By referring to the drawing, it will readily be seen that by placing the flange z in the upper portion of the furnace, it, in connection with the pointed radiator x, causes the air to be thrown directly upon the conical top w of the fire-chamber, where the greatest amount of heat is concentrated, and thence being directed to the top of the furnace, where it is further heated by the heat detained in the smoke-pipe t, the top of which produces a greater radiation than its bottom, and the heat emitted from the scroll of pipes E in the extreme top of the furnace directly under the hot-air pipes; the air has no chance to become cooled before entering the latter, as it has when a flange is formed in the lower portion of the furnace and there are no suitable extra appliances at the top for producing extra heat.

It will further be observed that the heated air rising above the fire-chamber, &c., is obliged to circulate under, between, and above the scroll of hot water or steam pipes, whence it receives a moist and live heat just before entering the hot-air pipes, which thus convey an agreeable temperature instead of a dead and injurious one to the various apartments of the building.

By the arrangement of the grate $q$ with four stems or sockets, $p$, it can readily be arranged to operate either from the front or side of the furnace, the sockets $m$ $m'$ being formed on the front or the side of the frame $i$, according to the way in which it is desired to operate the grate.

Having thus fully described my improvements, what I claim as my invention, and desire to have secured to me by Letters Patent, is—

1. A spiral scroll or other suitable arrangement of pipes, E, situated in the top of a furnace and connected with a cold-water pipe, B', attached to a coil of pipes, B, arranged around the inner periphery of a fire-chamber, $k$, one end of the spiral scroll or other arrangement of pipes E being connected with an upright pipe, B'', extending downward and attached to the coil of pipes B, substantially as specified.

2. A smoke-pipe, $t$, connected with a fire-chamber, $k$, and arranged with a straight longitudinal portion with which connect the ends of an octagonal or other polygonal-formed portion of the pipe, situated horizontally above the top of the fire-chamber $k$, and provided with a damper, $u$, substantially as specified.

3. A circular oblique flange, $z$, attached to the inside of the upper portion of the case $a$, in combination with a cone-shaped radiator, $x$, and case of a fire-chamber, $k$, all arranged substantially as specified.

4. A cone-shaped plate or radiator, $x$, formed with a zigzag or other suitably-formed aperture, $y$, situated over the conical top $w$ of a fire-chamber, $k$, substantially as specified.

5. A fire-chamber, $k$, provided with a coil of pipes, B, and having a conical top, $w$, connecting with a smoke-pipe, $t$, and attached to an outer case, $a$, by frame $i$, formed with sockets $m$ $m'$, arranged either toward the front or side of the furnace to receive rod $n$ and stem $r$, connected with grate $q$, substantially as specified.

6. A grate, $q$, formed with four stems or sockets $p$, in combination with rod $n$, stem $r$, frame $i$, fire-chamber $k$, and case $a$, substantially as specified.

7. A furnace having an outer case, $a$, partition $e$, air-passage $f$, frames $h$ and $i$, fire-chamber $k$, grate $q$, smoke-pipe $t$, radiator $x$, flange $z$, coil of pipes B, pipes B' B'', and spiral scroll or other suitable arrangement of pipes E, all arranged and operating substantially as specified.

In testimony whereof I have signed my name to this specification in the presence of two subscribing witnesses.

CHARLES M. DRENNAN.

Witnesses:
CARROLL D. WRIGHT,
SAMUEL M. BARTON.